United States Patent
Miyoshi (10) Patent No.: US 10,244,896 B2
(45) Date of Patent: Apr. 2, 2019

(54) FRYING MACHINE

(71) Applicant: FOODS TEC LTD., Tochigi (JP)

(72) Inventor: Okimitsu Miyoshi, Tochigi (JP)

(73) Assignee: FOODS TEC LTD., Tochigi (JP)

( * ) Notice: Subject to any disclaimer, the term of this patent is extended or adjusted under 35 U.S.C. 154(b) by 0 days.

(21) Appl. No.: 15/720,304

(22) Filed: Sep. 29, 2017

(65) Prior Publication Data

US 2018/0160853 A1 Jun. 14, 2018

(30) Foreign Application Priority Data

Dec. 8, 2016 (JP) .................................. 2016-238186

(51) Int. Cl.
*A47J 37/12* (2006.01)

(52) U.S. Cl.
CPC ........ *A47J 37/1219* (2013.01); *A47J 37/1276* (2013.01)

(58) Field of Classification Search
CPC .. A47J 37/1219; A47J 37/1276; A47J 37/129; A47J 37/1228
USPC ......... 99/423, 353, 407, 326, 334, 349, 386, 99/391
See application file for complete search history.

(56) References Cited

U.S. PATENT DOCUMENTS

| | | | | |
|---|---|---|---|---|
| 3,242,849 A * | 3/1966 | Wells | .................. | A47J 37/1219 219/437 |
| 3,635,722 A * | 1/1972 | Moore | ................. | A47J 27/0817 426/438 |
| 3,690,246 A * | 9/1972 | Guthrie, Sr. | ........ | A47J 27/0817 99/336 |
| 3,718,487 A * | 2/1973 | Brunner | .................... | A21B 5/03 99/353 |
| 5,687,640 A * | 11/1997 | Sala | ......................... | A21B 5/03 99/353 |
| 5,746,117 A * | 5/1998 | Chang | ................. | A47J 37/1219 99/407 |
| D413,225 S * | 8/1999 | King | ............................. | D7/354 |
| D418,366 S * | 1/2000 | King | ............................. | D7/339 |

(Continued)

FOREIGN PATENT DOCUMENTS

| | | |
|---|---|---|
| JP | 01-269458 | 10/1989 |
| JP | 09-121785 | 5/1997 |

(Continued)

*Primary Examiner* — Jimmy Chou
(74) *Attorney, Agent, or Firm* — Hauptman Ham, LLP (57) ABSTRACT

A frying machine for efficiently placing ingredients into a frying basket and removing fried food from the frying basket. Ingredients are placed into, and fried food is removed from, a frying basket by moving the frying basket and a frying tank cover to above the frying tank using a first transfer mechanism, moving the frying basket and frying tank cover to a predetermined position using a second transfer mechanism, and causing the frying basket to descend to an ingredient input position or fried food output position using the first transfer mechanism, and the ingredients are placed into the frying basket and the fried food is removed from the frying basket efficiently at the ingredient input position or fried food output position separated in the horizontal direction from a position above the frying tank in a configuration equipped with the frying tank cover adapted to open and close the frying tank.

14 Claims, 12 Drawing Sheets

(56) References Cited

U.S. PATENT DOCUMENTS

| | | | |
|---|---|---|---|
| 6,588,325 B1* | 7/2003 | Savage | A47J 37/1219 99/336 |
| 6,820,536 B2* | 11/2004 | Kijimoto | A47J 37/128 99/330 |
| 7,299,745 B2* | 11/2007 | Nelson | B30B 9/06 100/100 |
| 8,402,885 B2* | 3/2013 | Foster | A47J 36/00 99/407 |
| 2010/0092626 A1* | 4/2010 | Maurer | A47J 37/1214 426/233 |
| 2010/0206179 A1* | 8/2010 | Foster | A47J 36/00 99/407 |

FOREIGN PATENT DOCUMENTS

| | | |
|---|---|---|
| JP | 2001-061676 | 3/2001 |
| JP | 2008-109905 | 10/2006 |

* cited by examiner

FRYING MACHINE

BACKGROUND OF THE INVENTION

Field of the Invention

The present invention relates to a frying machine which produces fried food products such as French fries, fried chicken, friedcakes, and fried vegetable chips.

Description of the Related Art

This type of frying machine known conventionally includes one which comprises: a frying tank with an open top; a frying tank cover adapted to open and close the top of the frying tank; and a frying basket put in and out of the frying tank, wherein oil contained in the frying tank is heated, and once the frying basket containing frying ingredients is placed in the frying tank and the top of the frying tank is sealed with the frying tank cover, the ingredients are fried in the oil in the frying tank (see, for example, Japanese Patent Publication 2008-109905).

With this frying machine, the pressure in the frying tank sealed by a frying tank cover is reduced with a vacuum pump to fry ingredients in the oil at temperatures (e.g., approximately 120° C.) lower than normal temperatures (approximately 170° C.). The fried food produced at such low temperatures is less prone to oxidation than fried food produced at normal temperatures. This makes it possible to extend the expiration date of friedcakes and the like while preventing surfaces of fried food from burning, and thereby improve quality.

Now, with the conventional frying machine, in carrying new ingredients into the frying basket or carrying fried food out of the frying basket, it is necessary to move up the frying basket from the frying tank together with the frying tank cover and carry out work above the frying tank. In so doing, there is a problem in that although it is difficult to carry out work above the frying tank, because the frying basket and frying tank cover are supported coaxially by a spindle extending in a vertical direction, it is not possible to carry out work by moving only the frying basket to another position from above the frying tank and thus not possible to efficiently carry ingredients into the frying basket and carry fried food out of the frying basket.

BRIEF SUMMARY OF THE INVENTION

The present invention has been made in view of the above problem and has an object to provide a frying machine which makes it possible to efficiently carry ingredients into a frying basket and carry fried food out of the frying basket even in a configuration equipped with a frying tank cover adapted to close a top of a frying tank.

To achieve the above object, the present invention provide a frying machine comprising: a frying tank with an open top; a frying tank cover adapted to openably close the top of the frying tank; and a frying basket put in and out of the frying tank, the frying machine being configured to heat oil contained in the frying tank, and the frying basket containing frying ingredients is placed in the frying tank and the top of the frying tank is closed with the frying tank cover, fry the ingredients in the oil in the frying tank, the frying machine further comprising a first transfer mechanism adapted to move the frying basket in a vertical direction together with the frying tank cover, and a second transfer mechanism adapted to horizontally move the frying basket and frying tank cover moved upward by the first transfer mechanism, wherein when the frying basket and the frying tank cover are moved downward by the first transfer mechanism from above the frying tank, the top of the frying tank is closed with the frying tank cover with the frying basket placed in the frying tank, and ingredients are carried into the frying basket and fried food is carried out of the frying basket by moving the frying basket and the frying tank cover to above the frying tank using the first transfer mechanism, moving the frying basket and the frying tank cover to a predetermined position in a horizontal direction using the second transfer mechanism, and causing the frying basket to descend to a predetermined ingredient input position or fried food output position using the first transfer mechanism.

Consequently, since the frying basket and the frying tank cover moved to above the frying tank move to the predetermined position in the horizontal direction and the frying basket descends to the predetermined ingredient input position or fried food output position, allowing the ingredients to be carried into the frying basket, and the fried food to be carried out of the frying basket, in a configuration equipped with the frying tank cover adapted to open and close the top of the frying tank, the ingredients are carried into the frying basket and the fried food is carried out of the frying basket at a position separated in the horizontal direction from a position above the frying tank. In so doing, since the frying basket moves together with the frying tank cover, even if the frying basket and the frying tank cover are structured to be supported coaxially, the frying basket can be moved easily.

According to the present invention, in the configuration equipped with the frying tank cover adapted to open and close the top of the frying tank, the ingredients can be carried into the frying basket and the fried food can be carried out of the frying basket efficiently at the ingredient input position or fried food output position separated in the horizontal direction from the position above the frying tank. In so doing, since the frying basket can be moved easily even if the frying basket and the frying tank cover are structured to be supported coaxially, the present invention has the advantage of being able to avoid complicating the structure.

DETAILED DESCRIPTION OF THE INVENTION

FIGS. 1 to 13 show an embodiment of the present invention and concern a frying machine which produces fried food products such as French fries, fried chicken, friedcakes, and fried vegetable chips.

The frying machine according to the present embodiment includes a frying tank 10 adapted to contain oil 1, a frying tank cover 20 adapted to open and close a top of the frying tank 10, a frying basket 30 put in and out of the frying tank 10, a spindle 40 adapted to support the frying basket 30 and the frying tank cover 20, a first transfer mechanism 50 adapted to move the frying basket 30 together with the frying tank cover 20 in a vertical direction, a second transfer mechanism 60 adapted to horizontally move the frying basket 30 and the frying tank cover 20 moved upward by the first transfer mechanism 50, an ingredient input apparatus 70 adapted to carry ingredients into the frying basket 30 moved to an ingredient input position by the first and second transfer mechanisms 50 and 60, a conveying apparatus 80 adapted to convey fried food to a predetermined destination when the fried food is carried out of the frying basket 30 moved to a fried food output position by the first and second transfer mechanisms 50 and 60.

The frying tank 10 is made up of a cylindrical metal container with an open top and a flange 10a is provided on an opening edge of the top, projecting outward. The frying tank 10 is provided with plural legs 10b extending downward from an outer circumferential surface and is fixed to a floor by plural legs 10b. Also, the frying tank 10 includes a heating apparatus 11 adapted to heat the oil 1 in the frying tank 10 and a decompressor 12 adapted to reduce pressure in the frying tank 10. The heating apparatus 11 includes a heat exchanger 11a placed in the frying tank 10 and a boiler 11b adapted to generate high-temperature steam in the heat exchanger 11a and heats the oil 1 in the frying tank 10 using the heat exchanger 11a by circulating the steam from the boiler 11b through the heat exchanger 11a via a steam pipe 11c. The decompressor 12 includes a vacuum pump 12a adapted to suck air from space above an oil surface in the frying tank 10 and a radiator 12b adapted to cool air sucked by the vacuum pump 12a and reduces pressure in the frying tank 10 by sucking air in the frying tank 10 using the vacuum pump 12a.

The frying tank cover 20 has a convex upward shape, and a flange 20a adapted to abut the flange 10a of the frying tank 10 is provided on a peripheral edge of the frying tank cover 20. Also, a center of the frying tank cover 20 is penetrated by a spindle 40 slidably in the vertical direction. Note that a seal is provided between the flanges 10a and 20a as well as between the frying tank cover 20 and spindle 40 by non-illustrated packing or the like.

Figure 1:
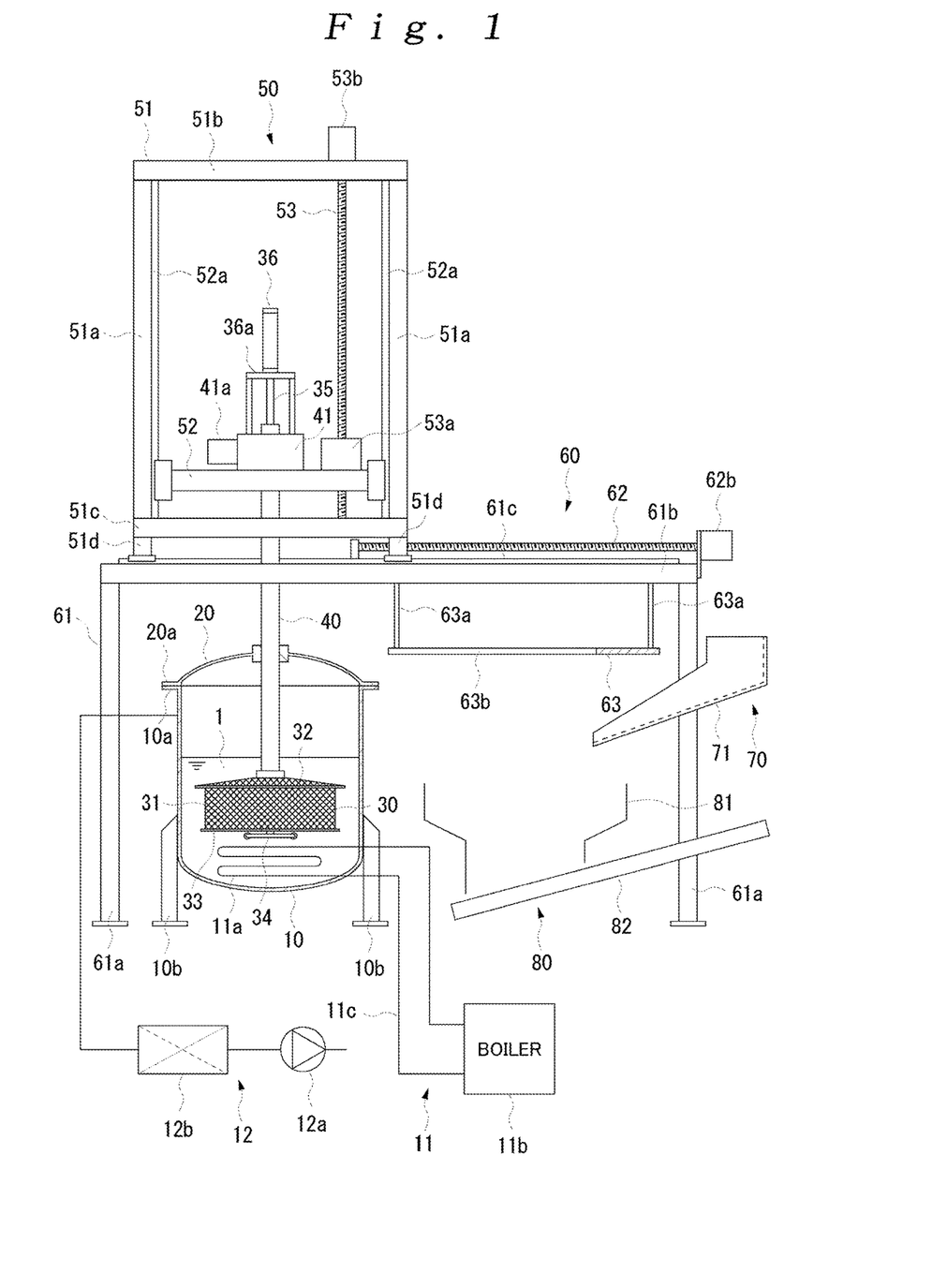
FIG. 1 is a partial sectional front view of a frying machine showing an embodiment of the present invention.
Figure 2:
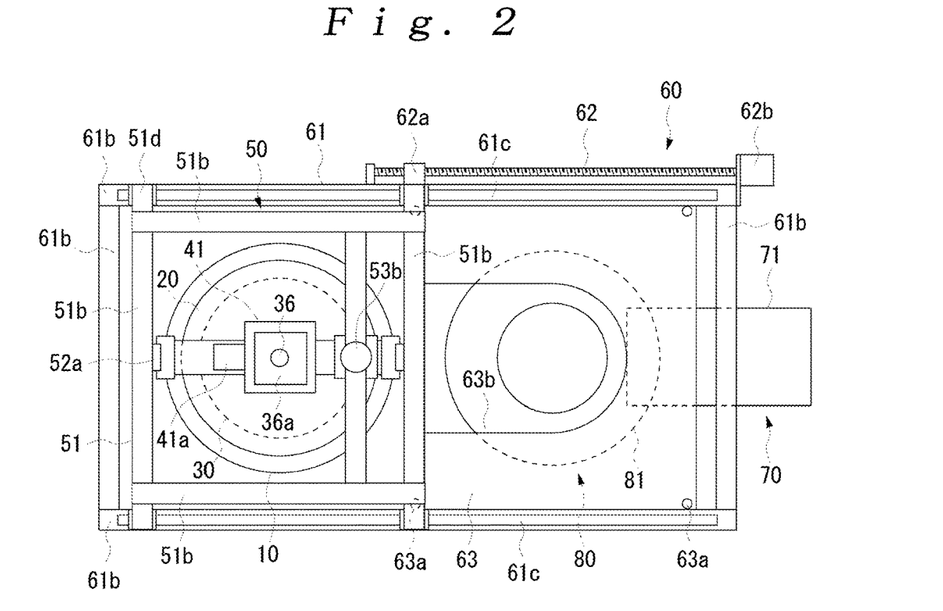
FIG. 2 is a plan view of the frying machine.
Figure 3:
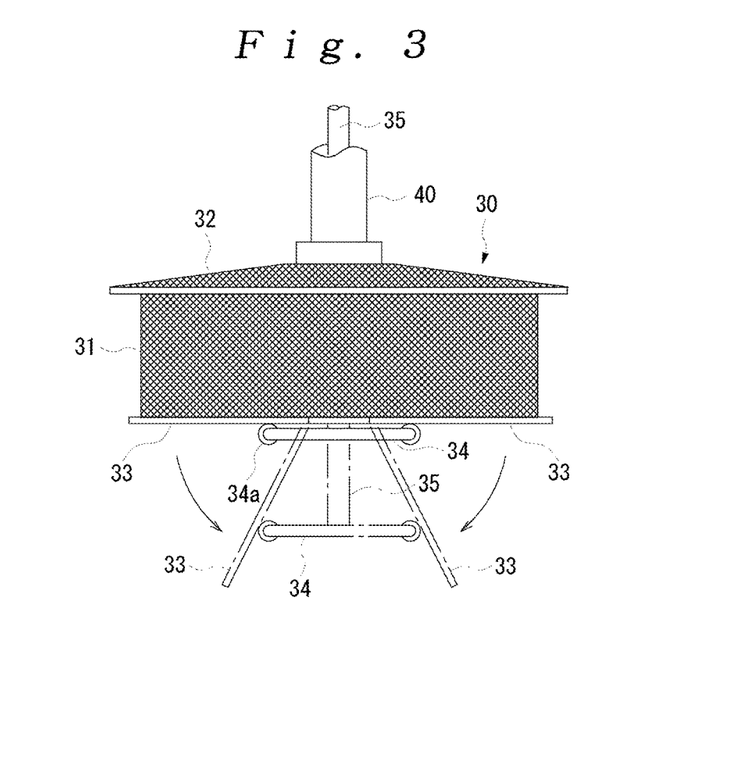
FIG. 3 is a front view of a frying basket.

The frying basket 30 includes a basket body 31 formed into a cylindrical shape, a basket cover 32 adapted to open and close a top of the basket body 31, and bottom plates 33 adapted to open and close a bottom of the basket body 31. The basket body 31, basket cover 32, and bottom plates 33 are made of oil-permeable members such as metal nets or punching grills. The basket body 31 is sized to be able to ascend and descend in the frying tank 10 and is fixed to a lower end of the spindle 40. The basket cover 32 is designed to be put on the top of basket body 31 and thereby close the top of the basket body 31 and is attached to the spindle 40 movably in the vertical direction. Also, a peripheral edge portion of the basket cover 32 extends outward of an upper edge portion of the basket body 31. Each of the bottom plates 33 has a semicircular shape formed by dividing a circular shape into two in a radial direction of the basket body 31, and is pivotally coupled to the basket body 31 on a center side. A restraining member 34 extending in the radial direction of the basket body 31 restrains undersurfaces of the bottom plates 33 to restrict the bottom plates 33 from pivoting downward. In this case, the restraining member 34 is installed in such a way as to be able to move in the vertical direction relative to the basket body 31, and when the restraining member 34 is moved downward, the bottom plates 33 pivot downward by being restrained by the restraining member 34 and thereby open the bottom of the basket body 31. The restraining member 34 is coupled to a lower end of a shaft 35 extending in the vertical direction and when the shaft 35 is moved up and down by a cylinder 36 coupled to an upper end of the shaft 35, the restraining member 34 moves up and down. The restraining member 34 restrains the bottom plates 33 via rollers 34a provided at opposite ends of the restraining member 34.

The spindle 40, which is a columnar member extending in the vertical direction, coaxially supports the frying basket 30 and frying tank cover 20. In this case, the frying tank cover 20 and basket cover 32 are moveable in the vertical direction relative to the spindle 40. An upper end of the spindle 40 is coupled to a drive unit 41 serving as rotating means for turnably supporting the spindle 40, and the drive unit 41 is designed to rotate the spindle 40 using a motor 41a. Also, the shaft 35 of the restraining member is passed through the spindle 40 moveably in the vertical direction relative to the spindle 40. On an upper end side, the shaft 35 extends upward from the upper end of the spindle 40.

The first transfer mechanism 50 includes a transfer mechanism body 51 placed above the frying tank 10, a moving part 52 installed on the transfer mechanism body 51 moveably in the vertical direction, and a ball screw 53 adapted to move the moving part 52 in the vertical direction relative to the transfer mechanism body 51. The transfer mechanism body 51 includes plural vertical members 51a placed by being spaced away from each other in a front-rear direction and width direction, plural upper transverse members 51b extending in the front-rear direction and width direction between upper ends of each pair of vertical members 51a, plural lower transverse members 51c extending in the front-rear direction and width direction between lower ends of each pair of vertical members 51a, and a pair of support members 51d extending in the front-rear direction under the lower transverse members 51c by being placed side by side in the width direction, where opposite ends of the support members 51d extend in the front-rear direction from the respective lower transverse members 51c. The moving part 52 is formed extending in the width direction of the transfer mechanism body 51, and opposite ends of the moving part 52 are engaged, moveably in the vertical direction, with a pair of front and rear guide rails 52a attached to the transfer mechanism body 51. The drive unit 41 of the spindle 40 is fixed to the moving part 52, and the spindle 40 supported by the drive unit 41 moves in the vertical direction together with the moving part 52. The ball screw 53 has a well-known configuration in which a threaded portion is formed in an outer circumferential surface, and is turnably supported on an upper side and lower side by the transfer mechanism body 51. The ball screw 53 is screwed in a female-threaded part 53a fixed to the moving part 52 and when the ball screw 53 is turned in a forward or reverse direction by a motor 53b coupled to the upper side, the moving part 52 moves up or down. Also, the cylinder 36 is placed above the drive unit 41, being fixed to the drive unit 41 via a stand 36a.

The second transfer mechanism 60 includes a transfer mechanism body 61 placed by surrounding the frying tank 10 from outside, and the first transfer mechanism 50 is placed on the transfer mechanism body 61 movably in the width direction. The transfer mechanism body 61 includes plural vertical members 61a placed by being spaced away from each other in the front-rear direction and width direction and plural transverse members 61b extending in the front-rear direction and width direction between upper ends of each pair of vertical members 61a, where the plural transverse members 61b extending in the width direction are approximately twice as long as the transfer mechanism body 51 of the first transfer mechanism 50 in the width direction. A pair of front and rear guide rails 61c are provided on a top of each transverse member 61b, and the support members 51d of the first transfer mechanism 50 are engaged, moveably in the width direction, with the respective guide rails 61c. Also, the second transfer mechanism 60 includes a ball screw 62 adapted to move the first transfer mechanism 50 in the width direction relative to the transfer mechanism body 51. The ball screw 62 has a well-known configuration in which a threaded portion is formed in an outer circumferential surface, and is turnably supported on an upper side and lower side by the transfer mechanism body 61. The ball screw 62 is screwed in a female-threaded part 62a fixed to the transfer mechanism body 51 of the first transfer mechanism 50 and when the ball screw 62 is turned in a forward or reverse direction by a motor 62b coupled to one end, the first transfer mechanism 50 moves toward one side or another along the width direction. The frying tank 10 is placed on a first side of the transfer mechanism body 61 in the width direction, and a restraining plate 63 serving as a restraining portion adapted to restrain the frying tank cover 20 and basket cover 32 from above are provided on a second side of the transfer mechanism body 61 in the width direction. The restraining plate 63 is placed below the transverse members 61b and coupled at four corners to the transverse members 61b via respective coupling members 63a extending in the vertical direction. A U-shaped notch 63b open on one side in the width direction (on the side of the frying tank 10) is provided in the restraining plate 63 and a front-rear width of the notch 63b is larger than an outer dimension of the basket body 31 of the frying basket 30, but smaller than an outer dimension of the basket cover 32. Consequently, the basket body 31 passes through the notch 63b in the restraining plate 63 and edge portions of the frying tank cover 20 and basket cover 32 are restrained by a top of the restraining plate 63.

The ingredient input apparatus 70 includes a chute 71 provided on the second side of the second transfer mechanism 60 in the width direction and introduces the ingredients conveyed by a non-illustrated conveying apparatus, into the frying basket 30 using the chute 71. The chute 71 is located obliquely above the frying basket 30 moved to the ingredient input position and is designed so as not to interfere with the frying basket 30 moving up and down.

The conveying apparatus 80 includes a hopper 81 placed below the frying basket 30 moved to the fried food output position and a conveyer 82 placed below the hopper 81, and receives the fried food carried out of the frying basket 30, using the hopper 81 and conveys the fried food to a predetermined position using the conveyer 82. In this case, the conveyer 82 conveys the fried food obliquely upward from below the hopper 81.

In the frying machine configured as described above, when the frying basket 30 placed in the frying tank 10 is moved upward by the first transfer mechanism 50, the frying basket 30 is restrained by the frying tank cover 20 at a predetermined height position and ascends together with the frying tank cover 20. Also, after the frying basket 30 and frying tank cover 20 are moved to above the frying tank 10 by the first transfer mechanism 50, the first transfer mechanism 50 is moved horizontally from the first side to the second side of the second transfer mechanism 60 in the width direction by the second transfer mechanism 60, and when the frying basket 30 and frying tank cover 20 are moved downward by the first transfer mechanism 50, the basket cover 32 of the frying basket 30 and the frying tank cover 20 are restrained by the restraining plate 63, causing only the basket body 31 of the frying basket 30 to descend to the fried food output position and ingredient input position.

Figure 4:
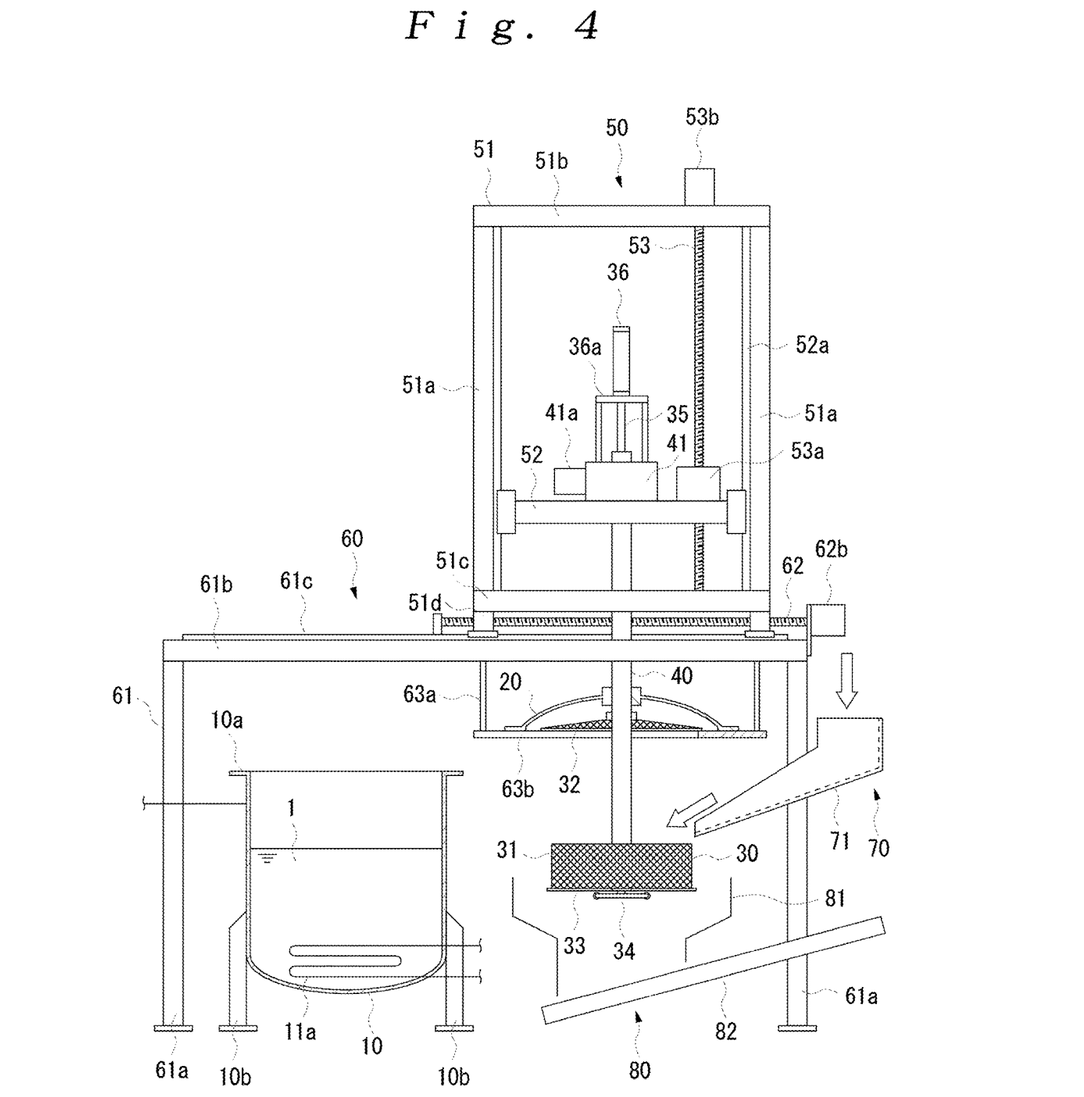
FIG. 4 is a partial sectional front view showing operation of the frying machine.

Now a fried food production process performed by the frying machine will be described. First, as shown in FIG. 4, the frying basket 30 is moved to the ingredient input position. In so doing, since the basket cover 32 of the frying basket 30 and the frying tank cover 20 are restrained by the restraining plate 63 located above, the top of the basket body 31 of the frying basket 30 is open. Next, as indicated by open arrows in FIG. 4, ingredients (e.g., cooking ingredients for French fries) are carried into the basket body 31 of the frying basket 30 by the ingredient input apparatus 70.

Figure 5:
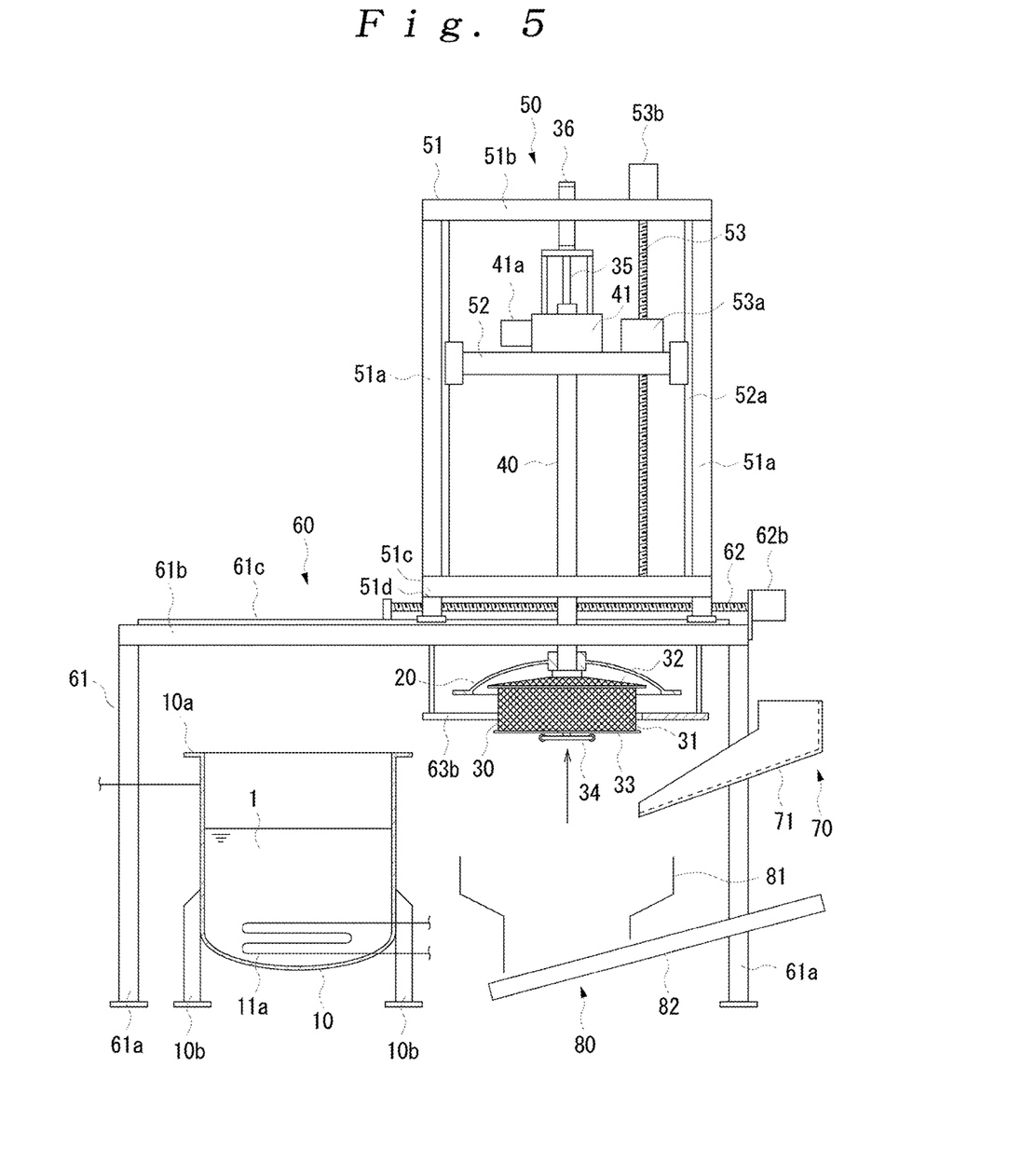
FIG. 5 is a partial sectional front view showing operation of the frying machine.

Next, when the basket body 31 is moved upward by the first transfer mechanism 50 as shown in FIG. 5, the top of the basket body 31 is closed by the basket cover 32 restrained by the restraining plate 63 and an upper end of the frying basket 30 is restrained by the frying tank cover 20, causing the frying basket 30 to ascend together with the frying tank cover 20.

Figure 6:
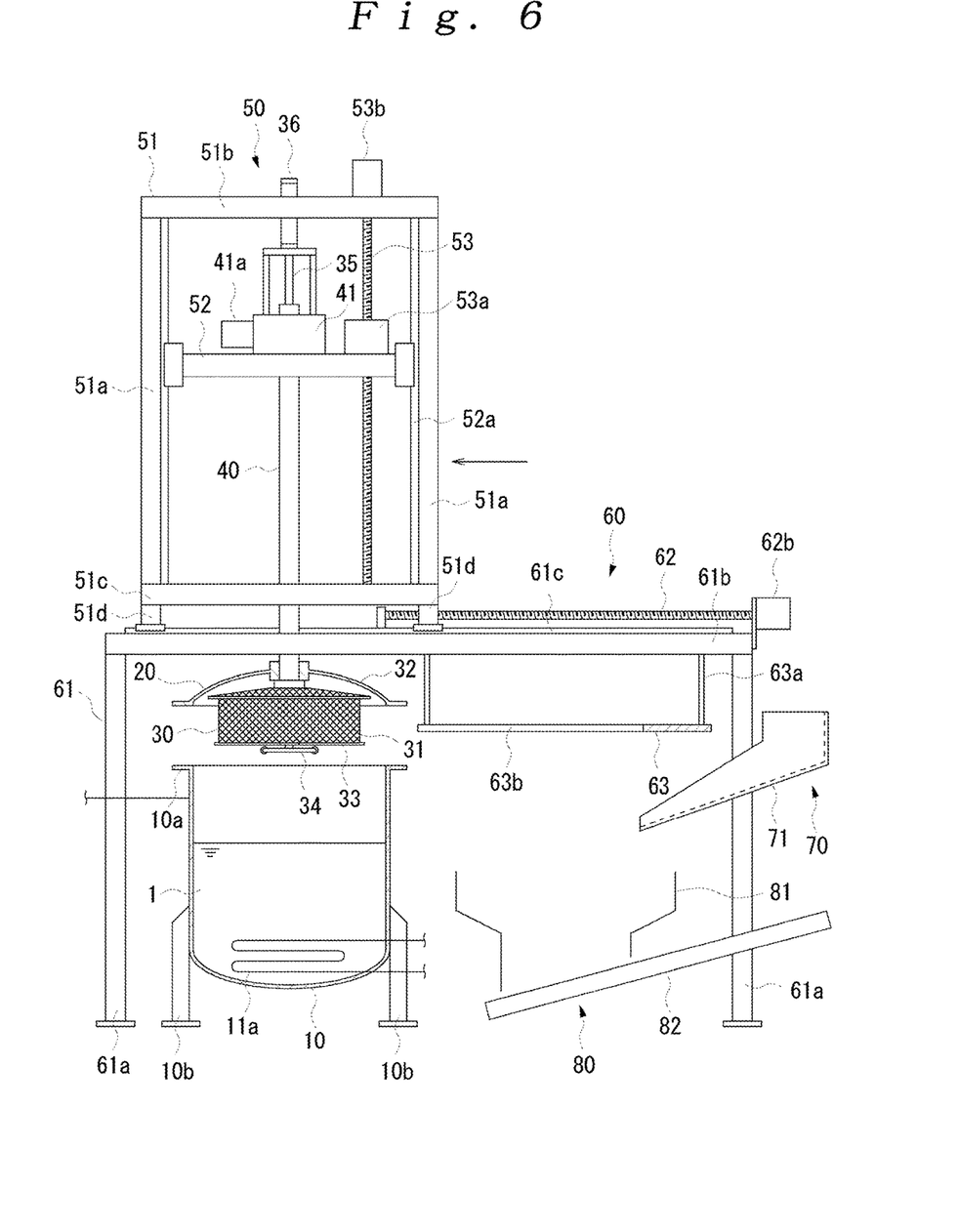
FIG. 6 is a partial sectional front view showing operation of the frying machine.

Next, the first transfer mechanism 50 is moved horizontally from the second side to the first side of the second transfer mechanism 60 in the width direction by the second transfer mechanism 60 as shown in FIG. 6, and the frying basket 30 and frying tank cover 20 are positioned above the frying tank 10.

Figure 7:
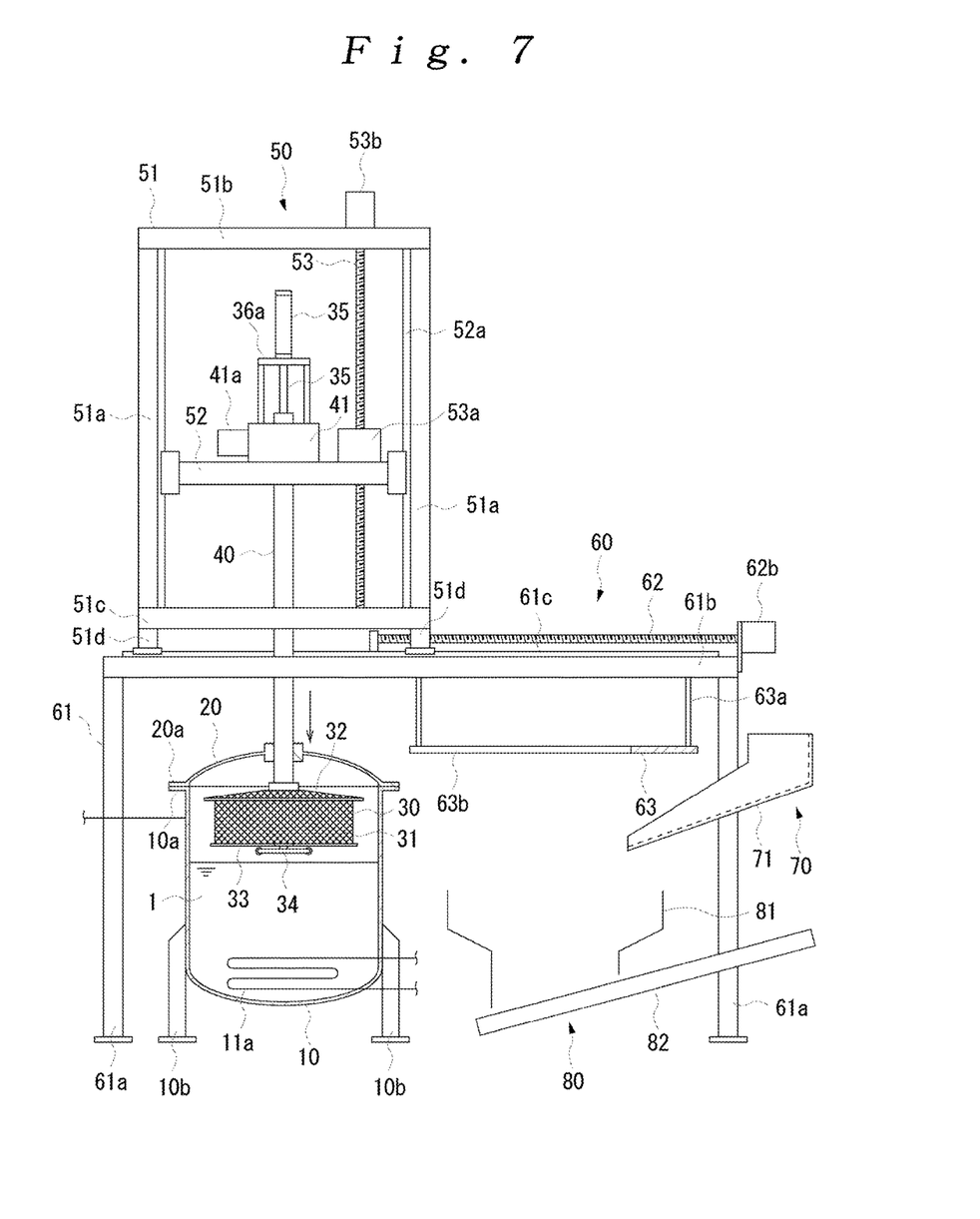
FIG. 7 is a partial sectional front view showing operation of the frying machine.

Subsequently, when the frying tank cover 20 is moved downward together with the frying basket 30 by the first transfer mechanism 50 as shown in FIG. 7, the frying tank cover 20 restrains an upper end of the frying tank 10, closing the top of the frying tank 10 and only the frying basket 30 descends and moves to above the oil surface in the frying tank 10. In so doing, the pressure in the frying tank 10 sealed by the frying tank cover 20 is reduced to a predetermined pressure (e.g., 0 to 31.3 kPa) by the decompressor 12 and the oil 1 in the frying tank 10 is heated to a predetermined temperature (e.g., 120° C.) by the heating apparatus 11.

Figure 8:
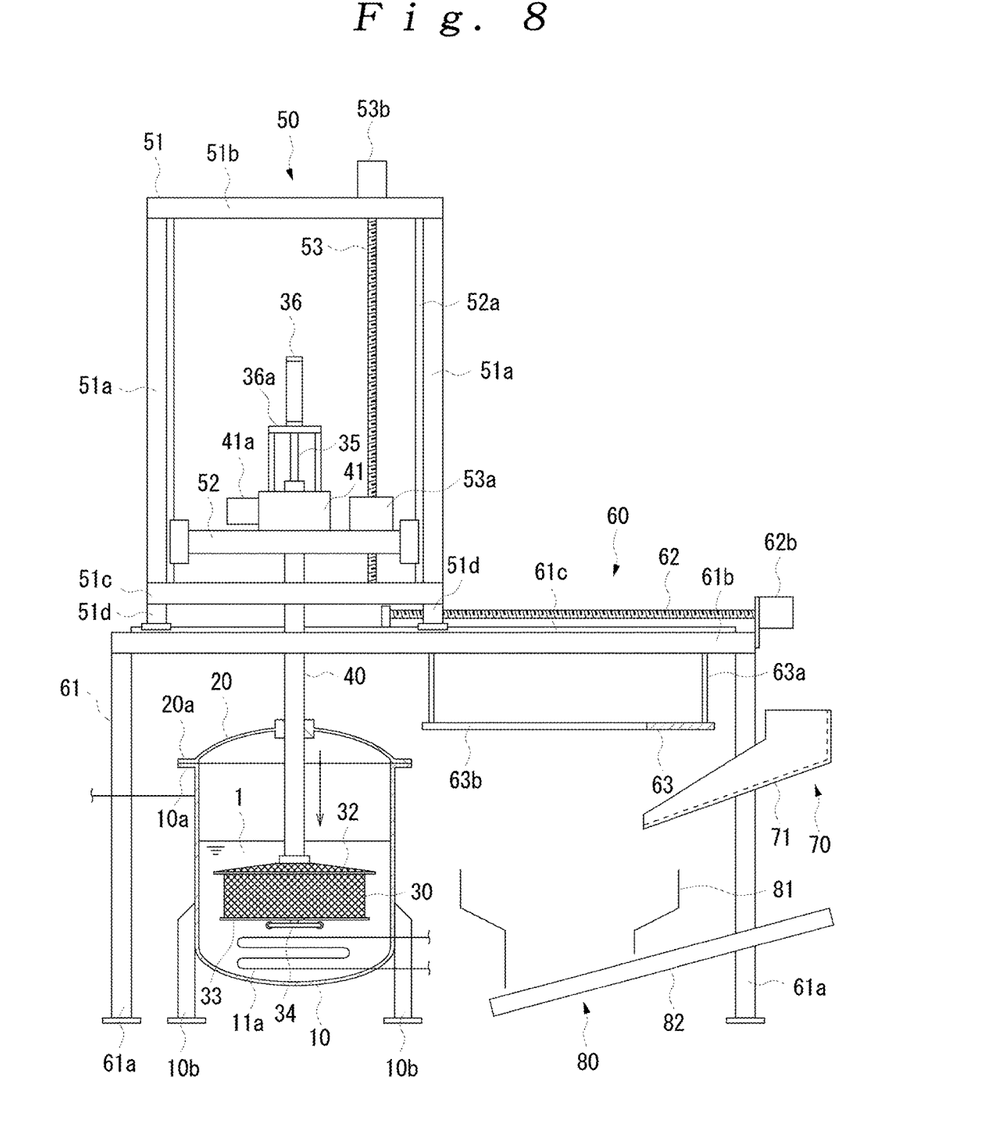
FIG. 8 is a partial sectional front view showing operation of the frying machine.

Next, as shown in FIG. 8, the frying basket 30 is moved further downward into the oil 1 in the frying tank 10, thereby heating and frying the ingredients with the oil 1 in the frying basket 30.

Figure 9:
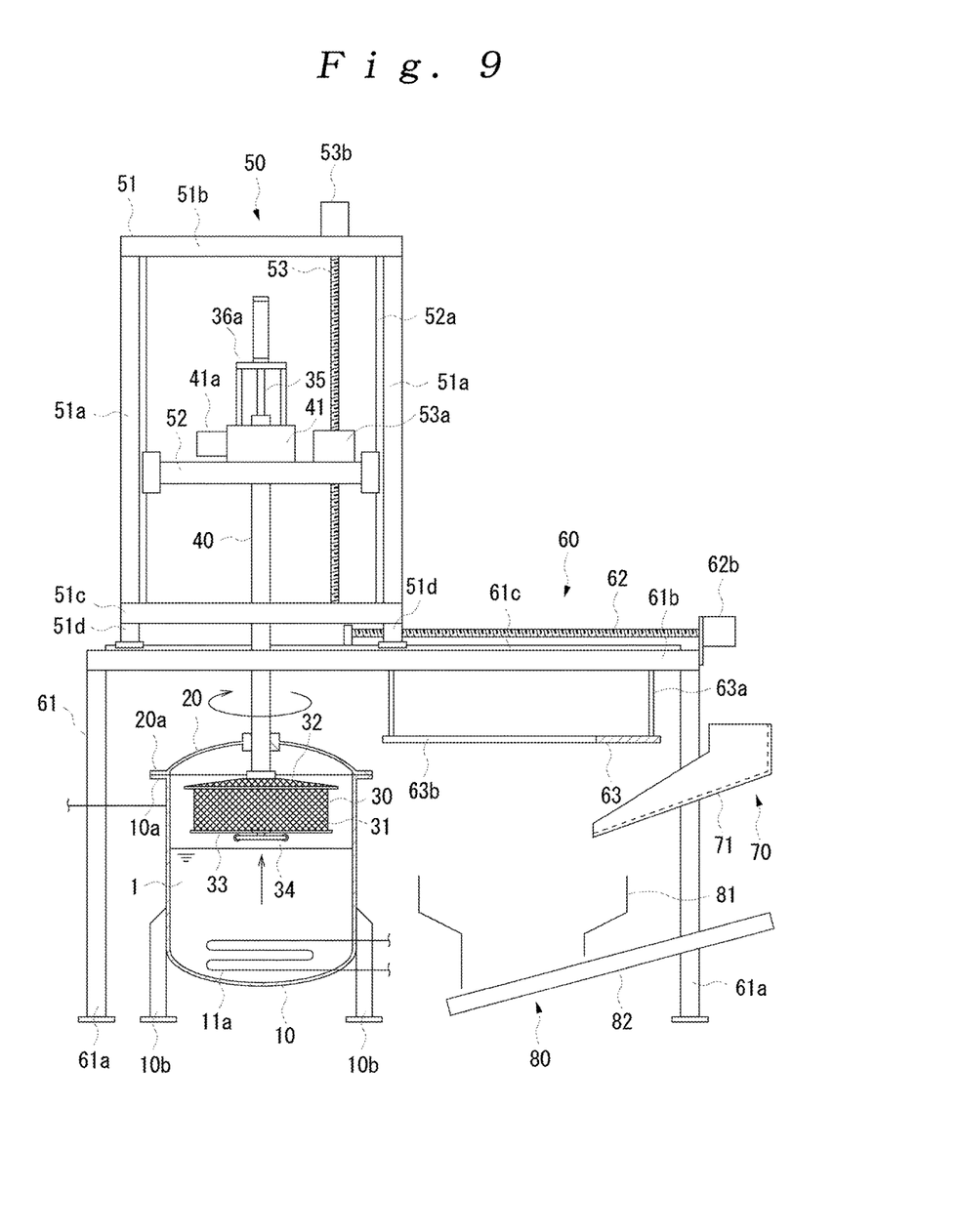
FIG. 9 is a partial sectional front view showing operation of the frying machine.

Next, as shown in FIG. 9, the frying basket 30 is moved to above the oil surface in the frying tank 10 sealed by the frying tank cover 20 and the spindle 40 is rotated by the drive unit 41. Consequently, the frying basket 30 rotates on the spindle 40, and the fried food in the frying basket 30 is drained of oil by centrifugal force.

Figure 10:
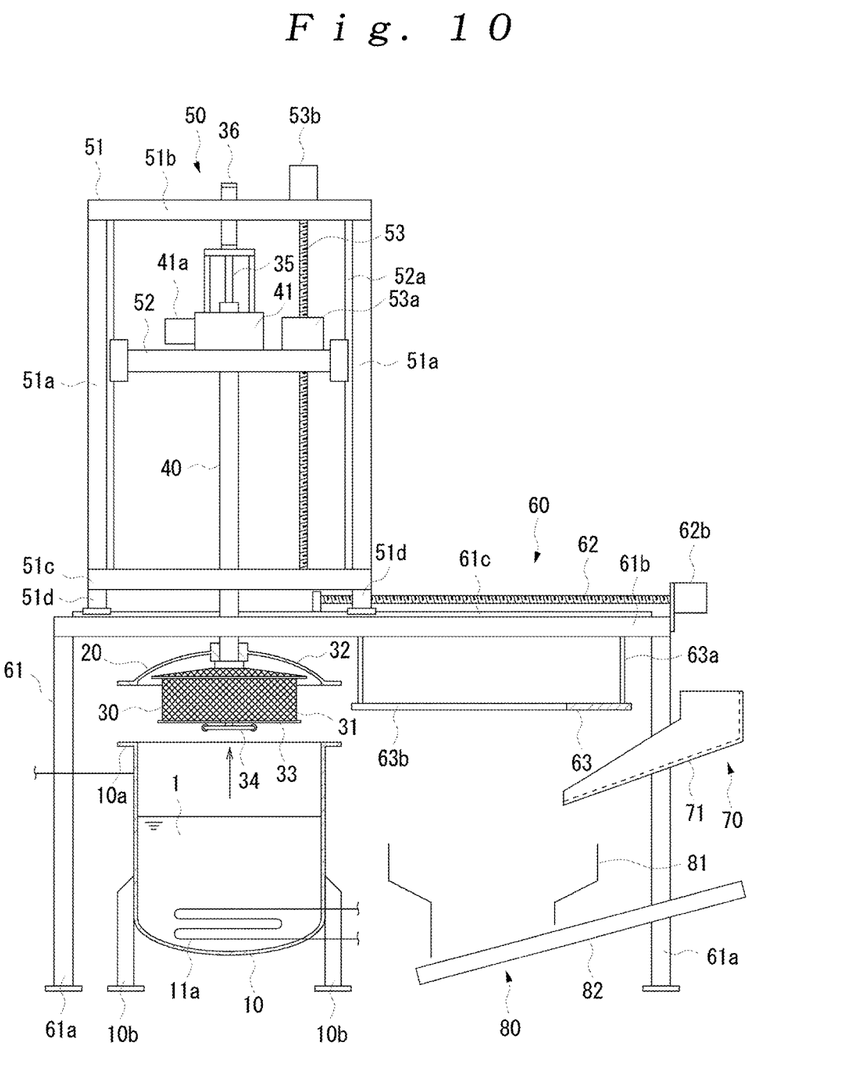
FIG. 10 is a partial sectional front view showing operation of the frying machine.

Subsequently, atmospheric pressure is restored in the frying tank 10, and the frying basket 30 is moved upward by the first transfer mechanism 50 as shown in FIG. 10. Consequently, the frying tank cover 20 closing the frying tank 10 restrains the upper end of the frying basket 30, causing the frying basket 30 to ascend together with the frying tank cover 20.

Figure 11:
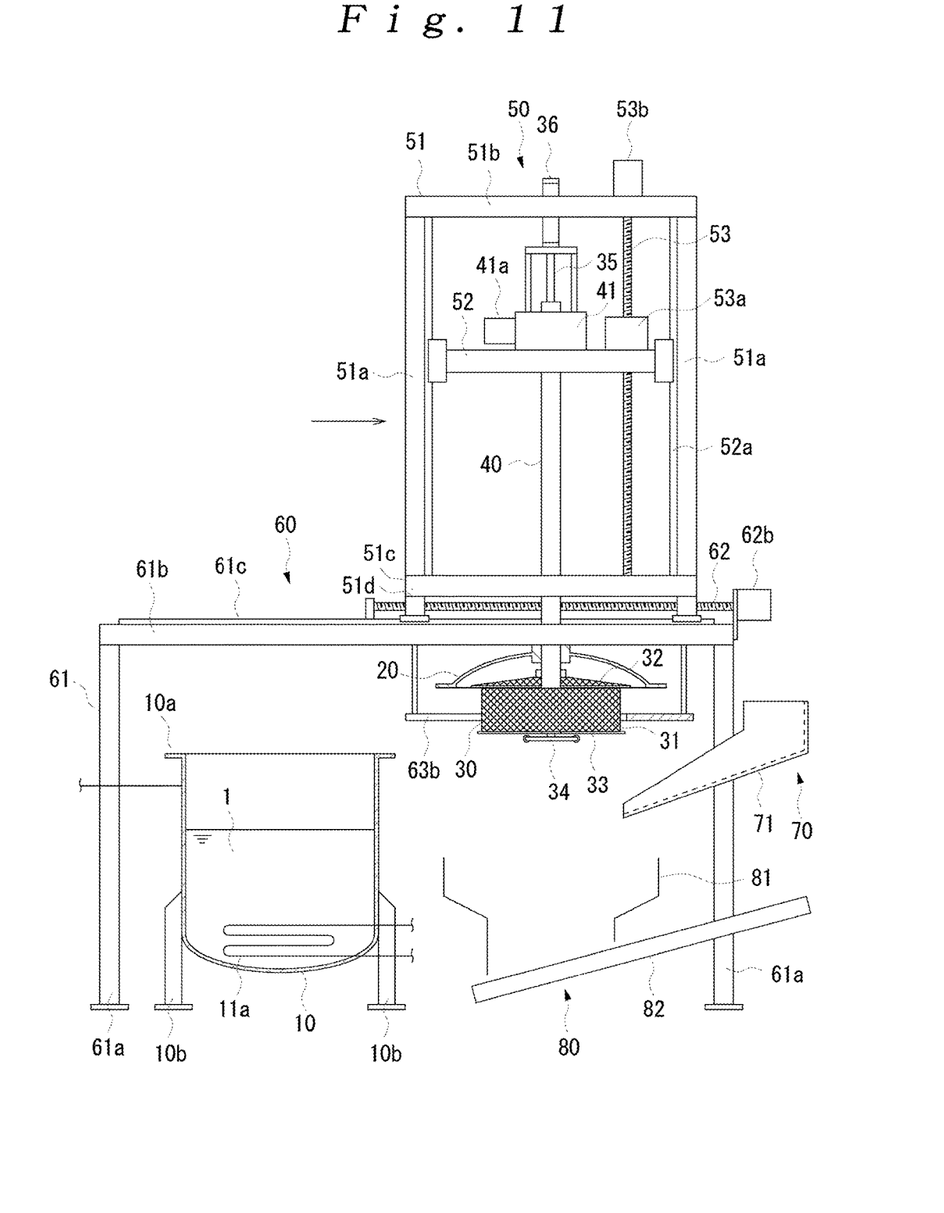
FIG. 11 is a partial sectional front view showing operation of the frying machine.

Next, as shown in FIG. 11, the first transfer mechanism 50 is moved horizontally from the first side to the second side of the second transfer mechanism 60 in the width direction by the second transfer mechanism 60, and the frying basket 30 and frying tank cover 20 are positioned above the restraining plate 63.

Figure 12:
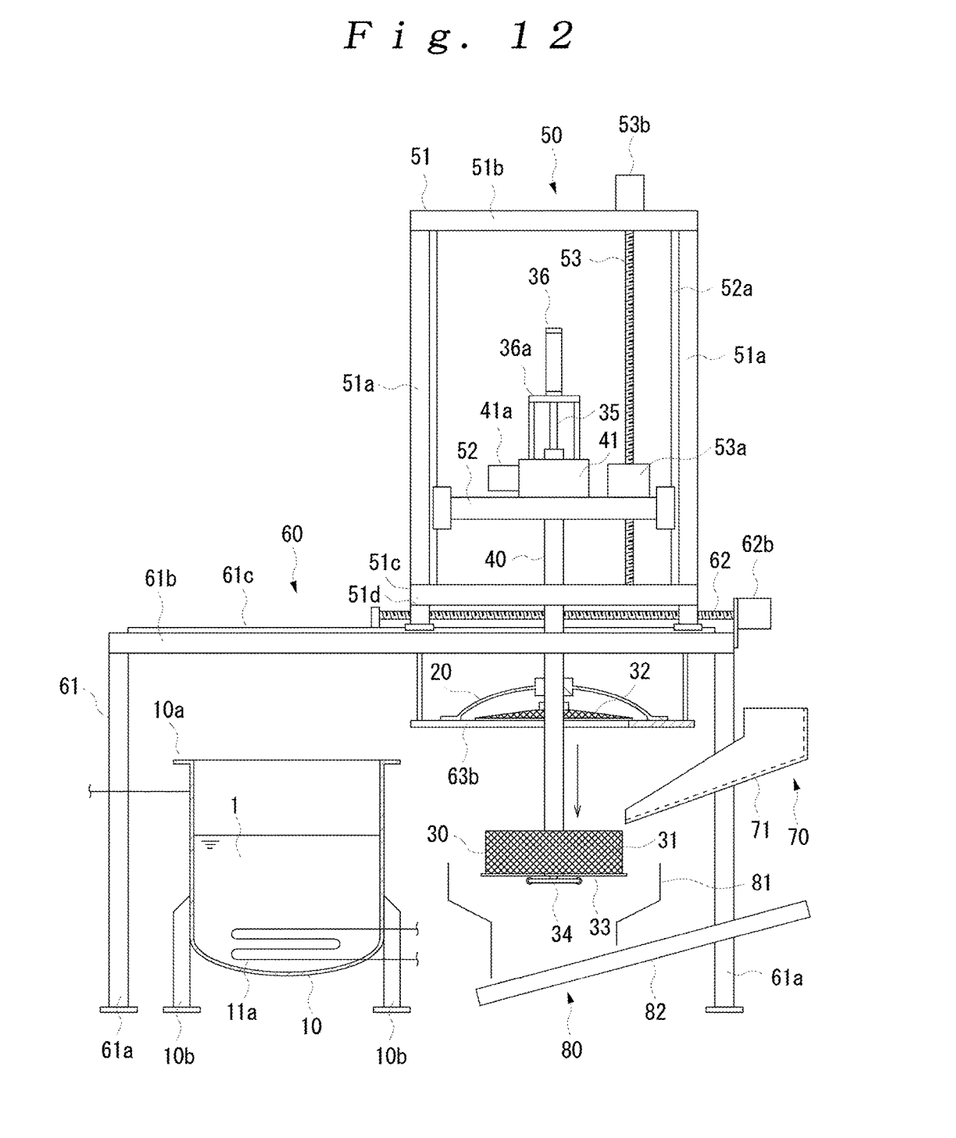
FIG. 12 is a partial sectional front view showing operation of the frying machine.

Subsequently, when the frying tank cover 20 is moved downward together with the frying basket 30 by the first transfer mechanism 50 as shown in FIG. 12, the basket cover 32 of the frying basket 30 and the frying tank cover 20 are restrained by the top of the restraining plate 63 and only the basket body 31 of the frying basket 30 descends and moves to the fried food output position.

Figure 13:
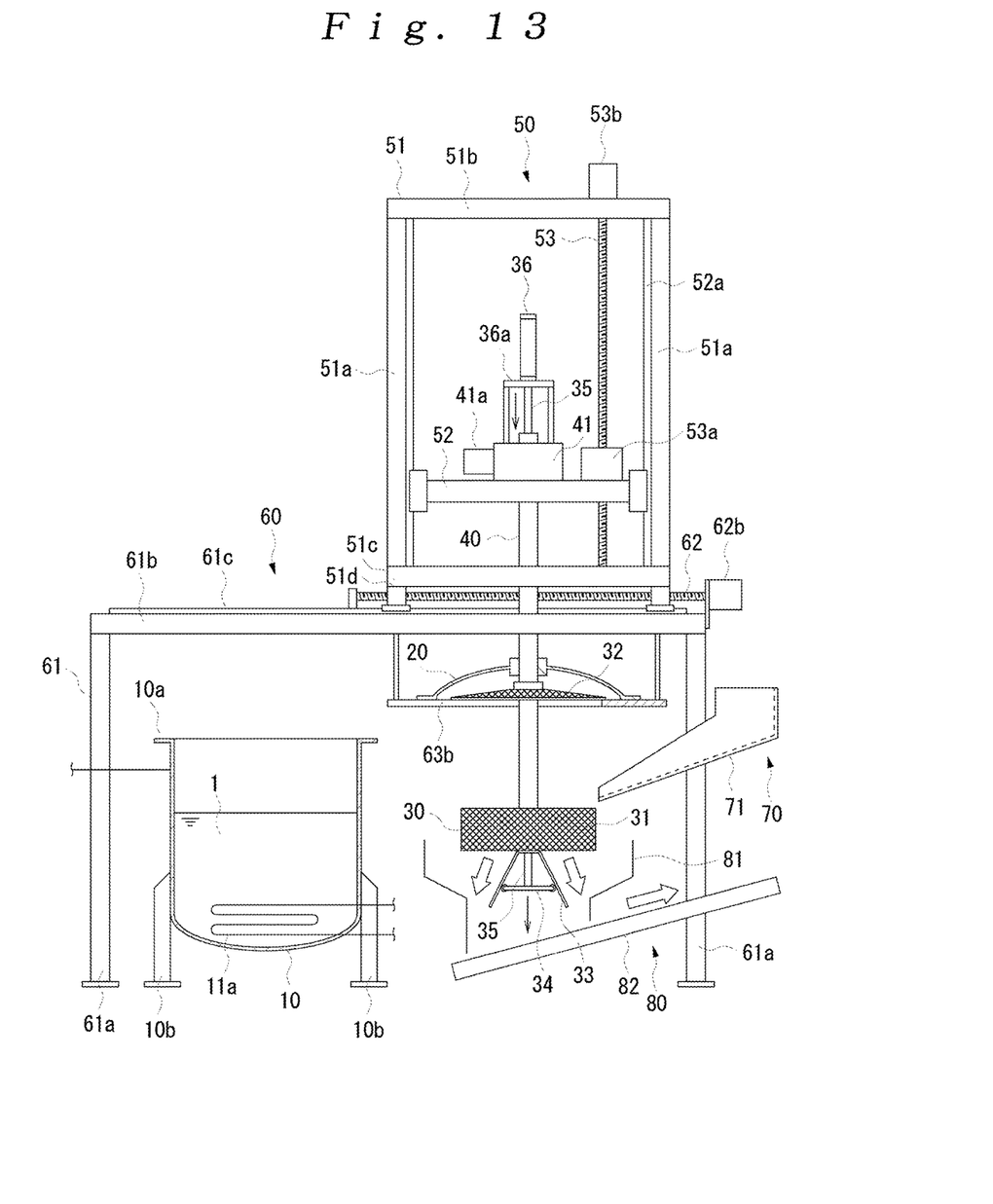
FIG. 13 is a partial sectional front view showing operation of the frying machine.

Then, when the restraining member 34 is moved downward by driving the shaft 35 with the cylinder 36 as shown in FIG. 13, the bottom plates 33 of the frying basket 30 open, releasing the basket body 31. Consequently, the fried food is carried out of the frying basket 30 and received by the hopper 81 of the conveying apparatus 80 as indicated by open arrows in FIG. 13, and conveyed to a predetermined destination by the conveyer 82.

Subsequently, the bottom plates 33 of the frying basket 30 are closed and new ingredients are carried into the frying basket 30 as with FIG. 4, thereby repeating the fried food production process described above.

In this way, with the frying machine according to the present embodiment, when the frying basket 30 and frying tank cover 20 are moved downward from above the frying tank 10 by the first transfer mechanism 50, the top of the frying tank 10 is closed with the frying tank cover 20 and the frying basket 30 is placed in the frying tank 10, the frying basket 30 and frying tank cover 20 are moved to above the frying tank by the first transfer mechanism 50, the frying basket 30 and frying tank cover 20 are moved to a predetermined position in a horizontal direction by the second transfer mechanism, the frying basket 30 is caused to descend to the ingredient input position or fried food output position by the first transfer mechanism 50, and ingredients are carried into the frying basket 30 or fried food is carried out of the frying basket 30, and thus in the configuration equipped with the frying tank cover 20 adapted to open and close the top of the frying tank 10, the ingredients can be carried into the frying basket 30 or fried food can be carried out of the frying basket 30 efficiently at the ingredient input position or fried food output position separated in the horizontal direction from a position above the frying tank 10. In so doing, since the frying basket 30 is moved together with the frying tank cover 20 by the first and second transfer mechanisms 50 and 60, the frying machine according to the present embodiment has the advantage of being able to move the frying basket 30 easily even if the frying basket 30 and frying tank cover 20 are structured to be supported coaxially and avoid complicating the structure.

Also, when the frying basket 30 and frying tank cover 20 are moved downward from above the frying tank 10 by the first transfer mechanism 50, the frying tank cover 20 is restrained by the frying tank 10, causing only the frying basket 30 to descend in the frying tank 10, and when the frying basket 30 is caused to ascend from within the frying tank 10 by the first transfer mechanism 50, the frying basket 30 is restrained by the frying tank cover 20 and caused to ascend together with the frying tank cover 20, making it possible to reduce an amount of travel in vertical direction of the frying tank cover 20 and downsize the entire frying machine in a height direction.

Furthermore, when the frying basket 30 and frying tank cover 20 moved to the predetermined position in the horizontal direction by the second transfer mechanism 60 are caused to descend by the first transfer mechanism 50, the frying tank cover 20 is restrained by the restraining plate 63, causing only the frying basket 30 to descend to the ingredient input position and fried food output position, and when the frying basket 30 is caused to ascend from the ingredient input position and fried food output position by the first transfer mechanism 50, the frying basket 30 is restrained by the frying tank cover 20 and caused to ascend together with the frying tank cover 20, making it possible to form a large space between the frying tank cover 20 and an upper border of the frying basket 30 lowered to the ingredient input position and fried food output position and easily carry ingredients into the frying basket 30.

Also, since the ingredient input apparatus 70 carries frying ingredients into the frying basket 30 moved to the ingredient input position, an ingredient input process can be automated.

Furthermore, since the frying basket 30 includes the basket body 31 with an open top and the basket cover 32 adapted to open and close the top of the basket body 31, the frying machine according to the present embodiment has the advantage that ingredients do not fly out of the frying basket 30 placed in the oil 1 in the frying tank 10. In this case, when the frying basket 30 and frying tank cover 20 moved to the predetermined position in the horizontal direction are caused to descend by the first transfer mechanism 50, the basket cover 32 is restrained by the predetermined restraining plate 63, causing the basket body 31 to descend alone and thereby release the basket cover 32, and thus even in a structure in which the frying basket 30 has the basket cover 32, opening and closing of the basket cover 32 can be automated.

Also, since the fried food carried out of the frying basket 30 at the fried food output position is conveyed to a predetermined destination by the conveying apparatus 80, a fried food conveying process can be automated.

Furthermore, since the bottom plates 33 of the frying basket 30 are configured to be able to be opened and closed and fried food is carried out downward by opening the bottom plates 33 at the fried food output position, the process of carrying fried food out of the frying basket 30 can be automated.

Besides, since fried food is drained of oil by rotating the frying basket 30 above the oil surface in the frying tank 10, oil can be drained in a short time, reducing the time required for the production process.

Since not only the frying process, but also processes from the ingredient input process to the fried food conveying process can be performed fully automatically as described above, the present embodiment can improve production efficiency of fried food and is extremely advantageous in mass-producing, for example, friedcakes at a factory.

Note that although in the embodiment described above, the ingredient input position and fried food output position are set at the same height, these positions may be set at different height levels.

The invention claimed is:
1. A frying machine comprising: a frying tank with an open top; a frying tank cover adapted to openably close the open top of the frying tank; and a frying basket put in and out of the frying tank, the frying machine being configured to heat oil contained in the frying tank, the frying basket containing frying ingredients is placed in the frying tank and the open top of the frying tank is closed with the frying tank cover, and fry the frying ingredients in the oil in the frying tank, the frying machine further comprising a first transfer mechanism adapted to move the frying basket in a vertical direction together with the frying tank cover, and a second transfer mechanism adapted to horizontally move the frying basket and frying tank cover moved upward by the first transfer mechanism, wherein when the frying basket and the frying tank cover are moved downward by the first transfer mechanism from above the frying tank, the top of the frying tank is closed with the frying tank cover with the frying basket placed in the frying tank, and ingredients are carried into the frying basket and fried food is carried out of the frying basket by moving the frying basket and the frying tank cover to above the frying tank using the first transfer mechanism, moving the frying basket and the frying tank cover to a predetermined position in a horizontal direction using the second transfer mechanism, and causing the frying basket to descend to a predetermined ingredient input position or fried food output position using the first transfer mechanism.

2. The frying machine according to claim 1, wherein:
when the frying basket and the frying tank cover are moved downward by the first transfer mechanism from above the frying tank, the frying tank cover is restrained by the frying tank, causing only the frying basket to descend in the frying tank; and when the frying basket is caused to ascend from within the frying tank by the first transfer mechanism, the frying basket is restrained by the frying tank cover and caused to ascend together with the frying tank cover.

3. The frying machine according to claim 1, wherein when the frying basket and frying tank cover moved to the predetermined position in the horizontal direction by the second transfer mechanism are caused to descend by the first transfer mechanism, the frying tank cover is restrained by a predetermined restraining portion, causing only the frying basket to descend to the ingredient input position or fried food output position, and when the frying basket is caused to ascend from the ingredient input position or fried food output position by the first transfer mechanism, the frying basket is restrained by the frying tank cover and caused to ascend together with the frying tank cover.

4. The frying machine according to claim 3, further comprising an ingredient input apparatus carrying said frying ingredients into the frying basket moved to the ingredient input position.

5. The frying machine according to claim 1, wherein:
the frying basket includes a basket body with an open top and a basket cover adapted to open and close the top of the basket body; and when the frying basket and frying tank cover moved to the predetermined position in the horizontal direction are caused to descend by the first transfer mechanism, the basket cover is restrained by a predetermined restraining portion, causing the basket body to descend alone and thereby release the basket cover.

6. The frying machine according to claim 1, further comprising a fried food conveying apparatus receiving fried food carried out of the frying basket at the fried food output position and conveying the fried food to a predetermined destination.

7. The frying machine according to claim 1, wherein:
a bottom of the frying basket is configured to be able to be opened and closed;
when the bottom of the frying basket is opened at the fried food output position, the fried food is carried out downward.

8. The frying machine according to claim 1, further comprising a rotating apparatus rotating the frying basket above an oil surface in the frying tank and thereby draining the fried food of oil.

9. A frying machine comprising:
a frying tank with an open top; a frying tank cover adapted to openably close the open top of the frying tank; and a frying basket configured to be put in and out of the frying tank, the frying machine being configured to heat oil contained in the frying tank, the frying basket containing frying ingredients is configured to be placed in the frying tank, to close the open top of the frying tank with the frying tank cover, and to fry the frying ingredients in the oil in the frying tank, the frying machine further comprising a first movement arrangement adapted to move the frying basket in a vertical direction together with the frying tank cover, the first movement arrangement including a first transfer mechanism body, the first transfer mechanism body including a first upper transverse member, a first lower transverse member, at least two first vertical members connected between the first upper and lower transverse members, at least two first guide rails each connected between the first upper and lower transverse members, a moving part movable in a vertical direction and engaged at opposite ends with the at least two first guide rails, and a ball screw configured to move the moving part in the vertical direction relative to the first transfer mechanism body, wherein the ball screw is connected to the first upper transverse member, and wherein the first transfer mechanism body is connected with the frying tank, and a second movement arrangement adapted to horizontally move the frying basket and frying tank cover moved upward by the first movement arrangement, the second movement arrangement including a second transfer mechanism body, the second transfer mechanism body including a transverse member, at least two second vertical members connected to the transverse member, at least two second guide rails each connected between the at least two second vertical members, and a ball screw, wherein the ball screw is connected with the first transfer mechanism body and configured to move the first transfer mechanism body in a horizontal direction, the second transfer mechanism body further includes a restraining plate connected with and below the transverse member, the restraining plate having a U-shaped notch defined therein and wherein the U-shaped notch has a width in a front-rear direction larger than an outer dimension of the frying basket, wherein when the frying basket and the frying tank cover are moved downward by the first movement arrangement from above the frying tank, the top of the frying tank is closed with the frying tank cover with the frying basket placed in the frying tank, and ingredients are carried into the frying basket and fried food is carried out of the frying basket by moving the frying basket and the frying tank cover to above the frying tank using the first movement arrangement, moving the frying basket and the frying tank cover to a predetermined position in a horizontal direction using the second movement arrangement, and causing the frying basket to descend to a predetermined ingredient input position or fried food output position using the first movement arrangement.

10. The frying machine according to claim 9, wherein when the frying basket and frying tank cover moved to the predetermined position in the horizontal direction by the second transfer mechanism are caused to descend by the first movement arrangement, the frying tank cover is restrained by a predetermined restraining portion, causing only the frying basket to descend to the ingredient input position or fried food output position, and when the frying basket is caused to ascend from the ingredient input position or fried food output position by the first movement arrangement, the frying basket is restrained by the frying tank cover and caused to ascend together with the frying tank cover.

11. The frying machine according to claim 10, further comprising an ingredient input chute carrying said frying ingredients into the frying basket moved to the ingredient input position.

12. The frying machine according to claim 9, further comprising a fried food conveyor arrangement, the fried food conveyor arrangement including a hopper and a conveyor below the hopper, the fried food conveyor arrangement configured to receive fried food carried out of the frying basket at the fried food output position and to convey the fried food to a predetermined destination.

13. The frying machine according to claim 9, further comprising a spindle extending in a vertical direction and connecting the first transfer mechanism body with the frying basket, the spindle configured to rotate the frying basket above an oil surface in the frying tank and thereby drain the fried food of oil, wherein an upper end of the spindle is coupled to a drive unit configured to rotatably support the spindle.

14. The frying machine according to claim 13, further comprising a shaft extending through the spindle and movable in a vertical direction relative to the spindle and wherein the shaft extends upward from an upper end of the spindle.

* * * * *